(12) United States Patent
College et al.

(10) Patent No.: US 10,532,955 B2
(45) Date of Patent: Jan. 14, 2020

(54) SYSTEM AND METHOD FOR THE PRODUCTION OF GYPSUM BOARD USING STARCH PELLETS

(71) Applicant: CertainTeed Gypsum, Inc., Malvern, PA (US)

(72) Inventors: John W. College, Pittsburgh, PA (US); Shane Libunao, Hanover, IN (US); Mark Harris, Land O Lakes, FL (US)

(73) Assignee: CertainTeed Gypsum, Inc., Malvern, PA (US)

( * ) Notice: Subject to any disclaimer, the term of this patent is extended or adjusted under 35 U.S.C. 154(b) by 85 days.

(21) Appl. No.: 15/858,622

(22) Filed: Dec. 29, 2017

(65) Prior Publication Data
US 2018/0186702 A1  Jul. 5, 2018

Related U.S. Application Data

(63) Continuation of application No. 14/537,646, filed on Nov. 10, 2014, now Pat. No. 9,902,656, which is a
(Continued)

(51) Int. Cl.
*C04B 38/10* (2006.01)
*C04B 28/14* (2006.01)
(Continued)

(52) U.S. Cl.
CPC .......... *C04B 38/10* (2013.01); *B28B 19/0092* (2013.01); *B29C 44/326* (2013.01); *B32B 37/24* (2013.01); *C04B 28/14* (2013.01); *E04C 2/043* (2013.01); *E04C 2/30* (2013.01); *B32B 38/164* (2013.01); *B32B 2037/243* (2013.01); *B32B 2305/30* (2013.01); *B32B 2315/18* (2013.01); *B32B 2317/12* (2013.01); *B32B 2607/00* (2013.01); *C04B 2103/42* (2013.01); *C04B 2111/0062* (2013.01); *C04B 2111/40* (2013.01); *Y10T 156/1712* (2015.01)

(58) Field of Classification Search
CPC ..................................................... C04B 38/10
See application file for complete search history.

(56) References Cited

U.S. PATENT DOCUMENTS 1,776,325 A * 9/1930 Robinson ................ C04B 28/14
                                                          106/674
5,643,510 A    7/1997 Sucech
(Continued)

FOREIGN PATENT DOCUMENTS

| CN | 1803427 | 7/2006 |
| CN | 101549981 | 10/2009 |
| WO | 00/14028 | 3/2000 |

*Primary Examiner* — Daniel H Lee
(74) *Attorney, Agent, or Firm* — McDonnell Boehnen Hulbert & Berghoff LLP

(57) ABSTRACT

The present invention relates to a system and method for the production of gypsum board using starch pellets. In accordance with the present disclosure, the starch necessary for board formation is provided in the form of starch pellets. These pellets are mixed with a gypsum slurry in a mixer. The pellets are initially insoluble and do not dissolve. However, during subsequent drying stages, the pellets become soluble and dissolve into the gypsum phase. This both provides the desired starch component and also results in the formation of voids within the set gypsum.

18 Claims, 3 Drawing Sheets

Related U.S. Application Data continuation of application No. 13/232,513, filed on Sep. 14, 2011, now Pat. No. 8,882,943.

(51) Int. Cl.
    *B29C 44/32*     (2006.01)
    *B32B 37/24*     (2006.01)
    *B28B 19/00*     (2006.01)
    *E04C 2/04*     (2006.01)
    *E04C 2/30*     (2006.01)
    *B32B 38/00*     (2006.01)
    *C04B 103/42*     (2006.01)
    *C04B 111/00*     (2006.01)
    *C04B 111/40*     (2006.01)

(56) References Cited

U.S. PATENT DOCUMENTS

| | | |
|---|---|---|
| 6,524,679 B2 | 2/2003 | Hauber et al. |
| 6,706,129 B2 | 3/2004 | Gopalakrishnan |
| 8,882,943 B2 | 11/2014 | College et al. |
| 9,902,656 B2 | 2/2018 | College et al. |
| 2005/0126437 A1 | 6/2005 | Tagge et al. |
| 2008/0223258 A1 | 9/2008 | Bruce et al. |
| 2010/0075166 A1 | 3/2010 | Gilley |

\* cited by examiner

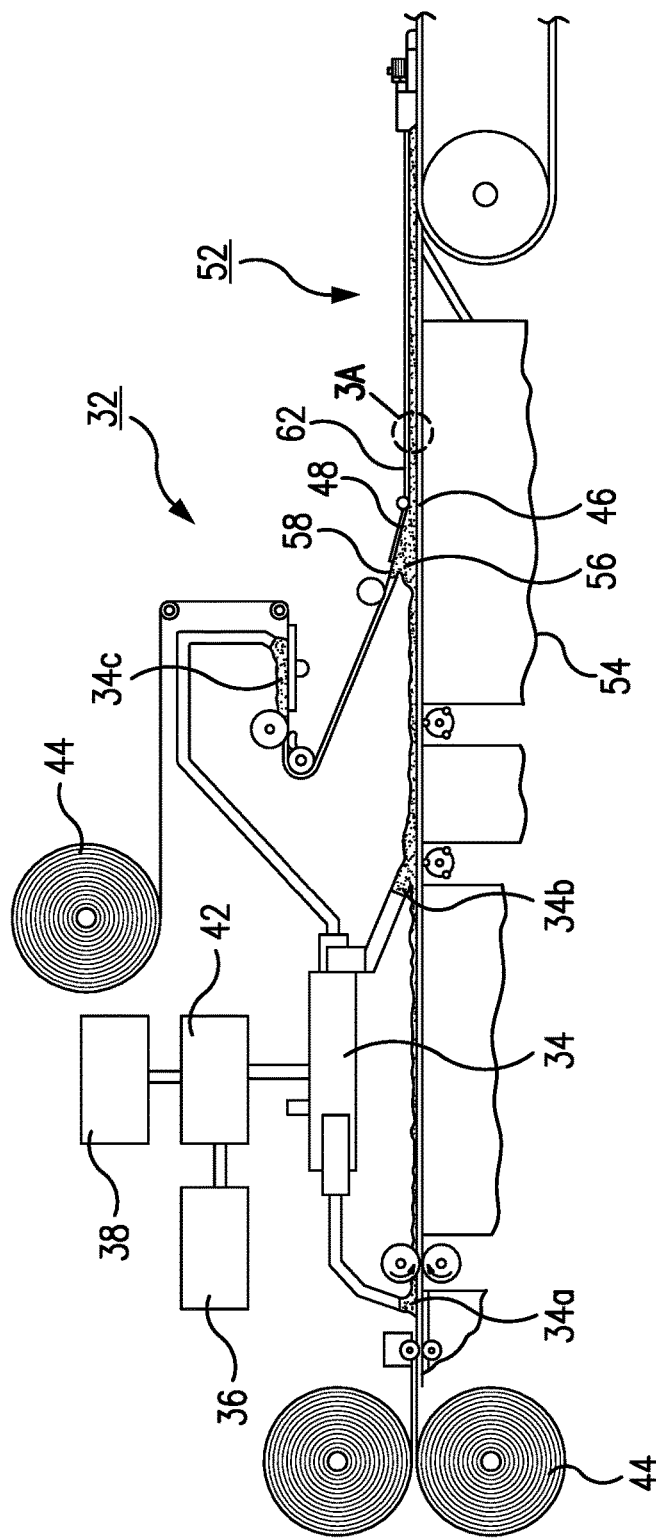
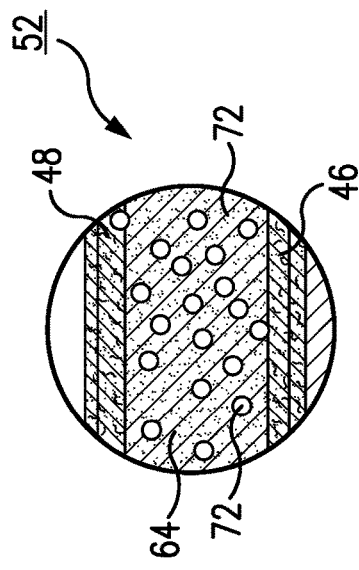
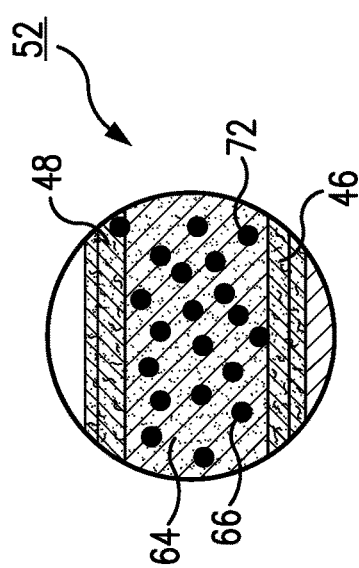
FIG. 2
FIG. 3B
FIG. 3A

SYSTEM AND METHOD FOR THE PRODUCTION OF GYPSUM BOARD USING STARCH PELLETS

CROSS-REFERENCE TO RELATED APPLICATIONS

This application is a continuation of and claims priority to application Ser. No. 14/537,646 filed Nov. 10, 2014, and entitled "System and Method for the Production of Gypsum Board Using Starch Pellets," which is a continuation of and claims priority to application Ser. No. 13/232,513, filed on Sep. 14, 2011, and entitled "System and Method for the Production of Gypsum Board Using Starch Pellets," now U.S. Pat. No. 8,882,943. The contents of these applications are fully incorporated herein by reference.

BACKGROUND OF THE INVENTION

Field of the Invention

This invention relates to the production of gypsum board. More particularly, the present invention relates to the use of foamed starch pellets in the production of lightweight gypsum board.

Description of the Background Art

Gypsum board is one of the most widely used and versatile building materials in the world. The general construction of gypsum board includes a core of calcium sulfate dihydrate that is sandwiched between opposing paper sheets. The core is initially deposited in the form of a slurry; namely, calcium sulfate hemihydrate ($CaSO_4 \cdot \frac{1}{2}H_2O$) in water. Once the slurry is deposited, it is rehydrated to form gypsum. The hemihydrate is initially prepared in a mill via the following reaction:

$$CaSO_4 \cdot 2H_2O + heat \rightarrow CaSO_4 \cdot \tfrac{1}{2}H_2O + 1\tfrac{1}{2}H_2O \text{ (steam)}$$

The dehydrated calcium sulfate is known as calcined gypsum, stucco, or plaster of Paris. Gypsum has a number of desirable physical properties that make it suitable for use as a building material. These properties include fire resistance, compressive strength and neutral pH. Gypsum is also a beneficial building material because it can be formed into various shapes and is inexpensive and plentiful.

It is also known in the art to use additives with gypsum. One such additive is starch. Starch can be added prior to rehydration. Starch functions as a binder within a set gypsum and yields boards with higher compressive and flexural strength. It also strengthens the edges of the resulting board and improves paper bond to the core.

It is further known in the art to form voids with the interior of gypsum board as a means for reducing the board weight. The background art includes several examples of void formation. One technique is described in U.S. Pat. No. 6,706,128 to Sethuraman. Sethuraman '128 discloses a method for adding air bubbles of different relative stabilities, whereby the air bubbles do not rupture before the slurry sets sufficiently to prevent the slurry from filing the void spaces left behind by ruptured bubbles. The result is a gypsum board with reduced weight.

Another example is illustrated in U.S. Pat. No. 1,776,325 to Robinson. Robinson '325 discloses a method of making a cellular wall board by incorporating an aerated starch into a slurry. As a result of the aerated starch, the slurry is given a desired porosity and forms a cellular core.

Finally, U.S. Pat. No. 5,643,510 to Sucech discloses a method for producing foamed gypsum board using a foaming agent blend. The ratio between a first and second foaming agent are controlled to adjust the sizes of foam voids within a gypsum core.

Although each of the above referenced inventions achieves its individual objective, they all suffer from common drawbacks. Namely, the voids are formed via the use of foaming agents require additional chemicals to be added to the gypsum. Void formation added via aeration likewise requires additional machinery. Moreover, in both methods the control of the associated machinery is difficult. In prior methods of void formation it is also difficult to form voids of the correct size.

SUMMARY OF THE INVENTION

One of the advantages of the disclosed method is that it results in void formation within gypsum building board.

Another advantage is that void formation can be increased without adding additional foaming agents.

Still yet another advantage is that void size can be controlled and/or specified.

Still another advantage is that the disclosed pellets provide the desired starch component to the board while at the same time providing voids within the core.

Another advantage is that the provided starch enhances the wall structure of the voids that are created upon the dissolution of the starch, as a fraction of the starch is retained at the void/solid interface.

Yet another advantage of the disclosed system and method is that it provides for the production of gypsum board that is both strong and lightweight.

These and other advantages are accomplished by a system and method that involves providing a mixture of stucco and foamed starch beads along a board production line. The starch pellets are slightly soluble at temperatures below 140° F. The stucco/foamed beads slurry is then deposited between opposing sheets to form a composite panel. The set wet board is then transferred to a dryer. Dryers are then used to dry the panel. The heating causes the starch to dissolve, whereby the dissolved beads provide starch to the gypsum core and/or bond area of the paper. The dissolving beads also create a fairly uniform bubble structure within the core. The pellets thereby produce voids within the set board.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which:

FIG. 2 is an elevational view of a board production line.

FIG. 3A is a sectional view of a board taken from FIG. 2.

FIG. 3B is a sectional view of a board taken from FIG. 5.

Similar reference characters refer to similar parts throughout the several views of the drawings.

DETAILED DESCRIPTION OF THE PREFERRED EMBODIMENT

The present invention relates to a system and method for the production of gypsum board using foamed starch beads. In accordance with the present disclosure, the starch needed for preferred board formation is provided in the form of individual foamed beads. These beads are dispersed within a gypsum slurry by way of a mixer. The pellets are initially insoluble and do not dissolve in the presence of the gypsum slurry. However, during subsequent heating in a dryer, the beads become soluble and dissolve into the gypsum phase. This dissolution provides the desired starch component to the gypsum while at the same time producing voids within the core.

The preferred starch beads, or pellets, are formed by way of an extrusion process. During the process, air is combined with starch via an extruder. The resulting foamed pellets may be of an irregular size but generally have a diameter of between approximately 1/32 of an inch to 1/64 of an inch. A mix of different sized pellets can also be used. Other sizes can be produced depending upon the parameters of the extruder. Other processes can likewise be used for formation of the foamed starch pellets. For example, the pellets can be formed via known prilling processes. They can also be made into droplets similar to polystyrene manufacturing methods. In the preferred embodiment, the foamed pellets are hydrophobic at low temperatures and resist dissolving at temperatures below approximately 140° F.

Figure 1:
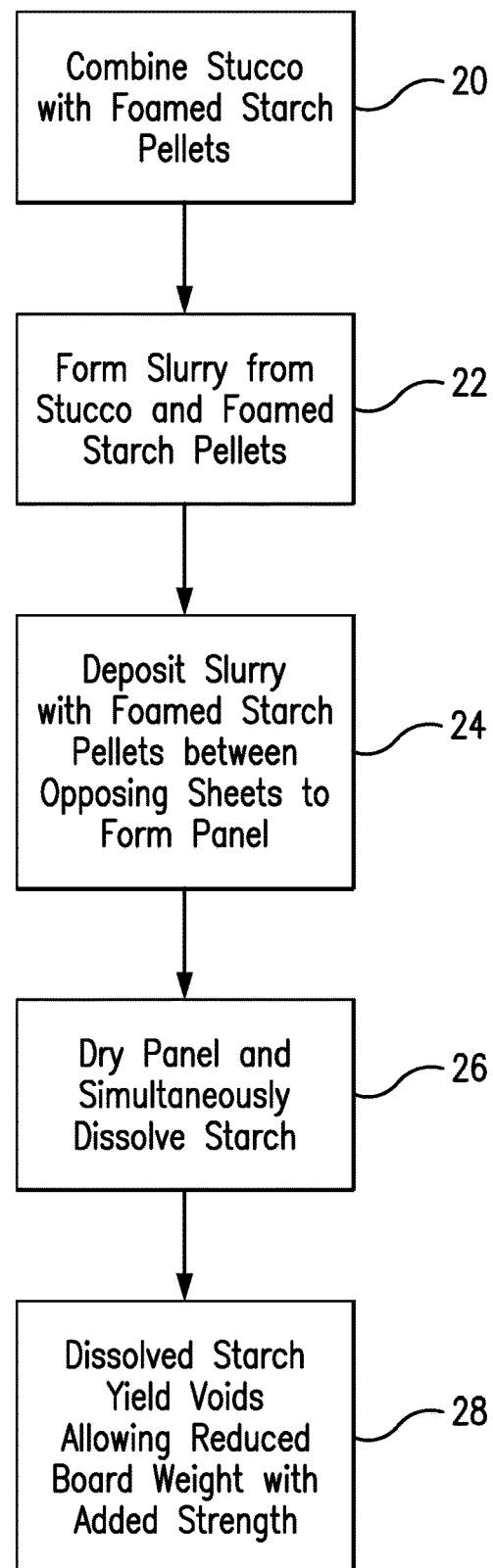
FIG. 1 is a flow chart illustrating the steps associated with the disclosed method.

FIG. 1 is a flow chart illustrating the steps carried out in accordance with the present disclosure. In the first step 20, the foamed pellets are combined with stucco. In the preferred embodiment, the pellets make up between approximately 5 to 50% of the overall slurry by volume. Preferably, the pellets and stucco are combined prior to the mixer.

At step 22, the pellets and stucco are mixed with water in a mixer to create a slurry. The mixer can be a conventional mixer typically found in board production lines. This blending step fully encapsulates the pellets within the resulting slurry. Again, however, the pellets remain insoluble at this point and the starch is not dissolved into the gypsum phase. The blended slurry is then deposited between opposing paper sheets to form a panel at step 24.

The panel with the slurry and encapsulated pellets are then dried in a series of dryers at step 26. As the panel is dried, and the temperature of the board approaches 200° F., the pellets become soluble and dissolve into the gypsum phase as starch. The dissolved pellets leave behind voids within the board. The panel dries simultaneously with the starch dissolution. The result, as noted at step 28, is a set gypsum board that contains both the desired amount of starch and that has voids to reduce the weight of the board.

The system of the present disclosure is carried out along a board production line 32 as noted in FIG. 2. A suitable product line is more fully described in commonly owned U.S. Pat. No. 6,524,679 to Hauber, the contents of which are fully incorporated herein. Production line 32 generally includes a mixer 34 with various outlets 34a, 34b, and 34c. These outlets can deposit slurry in varying densities in order to form a core with varying physical properties. Supplies of foamed pellets and stucco are also included (36 and 38, respectively). These supplies feed into a container 42 where the pellets and stucco are initially combined. In the preferred embodiment, the foamed pellets and stucco are mixed while dry. Water is subsequently added at mixer 34 to form a slurry and begin the re-hydration process. As noted, the pellets and slurry are preferably combined at a ratio of between approximately 5-50% by volume.

Container 42, in turn, feeds into mixer 34. This can be a conventional mixer currently used in a gypsum board manufacture. As noted, mixer 34 is used in blending the pellets and stucco with water. This blending converts the stucco to slurry and ensures that the individual pellets are encapsulated by slurry. Additional additives can be added to the mixer as needed depending upon the requirements of the gypsum board.

The production line further includes two or more large wound rolls of paper 44. In one embodiment, two rolls are included for forming the upper and lower paper sheets (46 and 48, respectively) of the gypsum board 52. Additional rolls can be provided for including fibrous mats or other sheets depending upon the intended use of the resulting board. Mixer 34 deposits the gypsum slurry between sheets 46 and 48 upon a forming table 54. The majority of the slurry is preferably dispensed at outlet 34b. If desired, a small amount of denser slurry can be applied to bottom paper sheet 46 at outlet 34a. A denser slurry can likewise be applied to upper paper sheet at outlet 34c. Outlets 34a, 34b, and 34c can all deliver blended slurry with pellets from mixer 34. Alternatively, the blended gypsum with pellets can be limited to outlet 34b, with outlets 34a and 34c supplying gypsum slurry without pellets.

In either alternative, top sheet 48 is applied over the deposited gypsum with blended pellets immediately prior to a pinch point 56. Thereafter, the resulting panel 52 is passed through a hinge plate 58 and extrusion plate 62 to ensure that the panel 52 as the desired thickness. With reference now again to FIG. 3A, it is seen that following extruder 62, a panel 52 is a composite that includes a bottom paper sheet 46, the blended gypsum core 64 with encapsulated pellets 66, and a top paper sheet 48. Moreover, the individual foamed pellets 66 are distributed throughout the thickness of the gypsum core 64. At this stage, the pellets are undissolved, only slightly soluble, and fully encased within the core 64 of unset slurry. Prior to entering the board dryers 68, the gypsum core sets in accordance with the following equation:

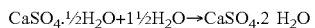

$$CaSO_4 \cdot \tfrac{1}{2}H_2O + 1\tfrac{1}{2}H_2O \rightarrow CaSO_4 \cdot 2\,H_2O$$

Figure 4:
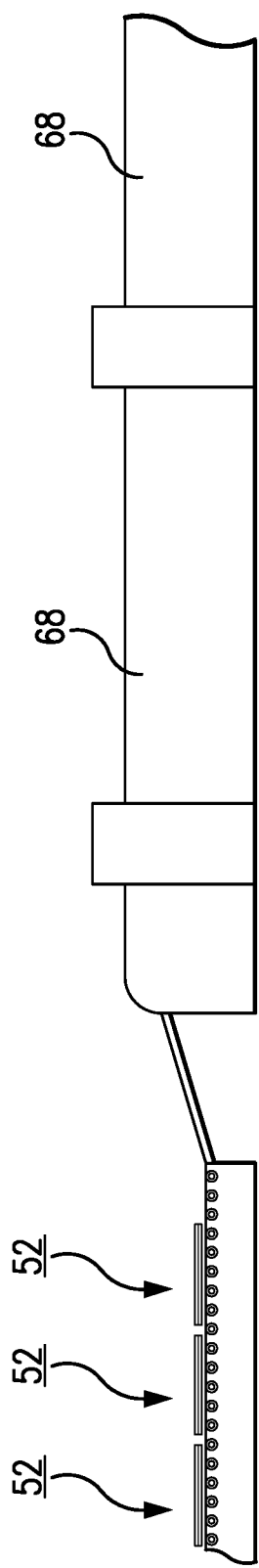
FIG. 4 is an elevational view of the entrance to a board dryer.
Figure 5:
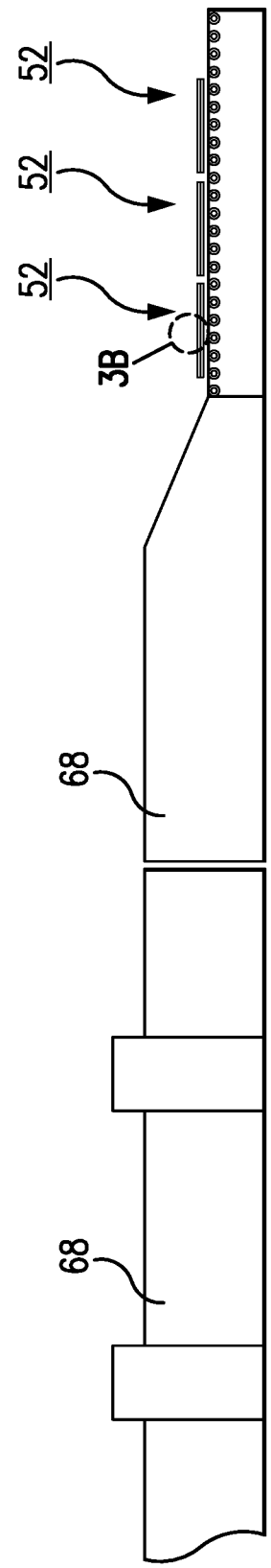
FIG. 5 is an elevational view of the exit from a board dryer.

Thereafter, the composite panel is cut into desired lengths at cutting stations (not shown) and then delivered via belts to a series of board dryers 68. FIG. 4 illustrates the composite panels being delivered to the entrance of board dryer 68, whereas FIG. 5 illustrates the composite panels exiting board dryer 68. During the drying phase, the panel is exposed to temperatures in excess of 140° F. and generally in the neighborhood of 200° F. As is known in the art, the dryers 68 are used to dry the gypsum slurry. However, in accordance with the present disclosure, the excess temperatures also cause the individual pellets 66 encapsulated within the gypsum to become very soluble. After becoming soluble, pellets dissolve 66 whereby the starch is dissolved into the gypsum phase of core 64. This starch, when combined with the gypsum, provides the necessary degree of board strength and can also improve the bond between the facing paper and the core.

Upon dissolving, the individual foamed pellets 66 leave behind voids 72 which, like pellets 66, are distributed throughout the thickness of the set gypsum core 64 (note FIG. 3B). The result is a gypsum building panel 52 with a core 64 of set gypsum. This set gypsum has the needed starch by virtue of the dissolution of the foamed pellets 66. Additionally, voids 72 that are left behind function to both reduce the overall weight of panel 52 and provide added strength. Each individual void also includes a peripheral lining. The starch dissolution is such that the starch concentration is higher at the void lining than in the remaining core body.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A method of producing lightweight gypsum board, the method utilizing a board production line including a mixer, a forming table, and dryers, the method comprising:
   providing a plurality of starch pellets, the pellets being of a uniform size and being only slightly soluble at temperatures below approximately 140° F., the pellets being more soluble at elevated temperatures;
   adding the pellets to a gypsum slurry in a pellet to gypsum ratio of between approximately 5/100 to 50/100 by volume;
   blending the gypsum slurry and pellets within the mixer whereby the pellets become fully encapsulated within the slurry;
   supplying a first facing sheet to the forming table prior to the mixer;
   discharging the blended gypsum and pellets from the mixer and onto the first facing sheet;
   supplying a top facing sheet over the blended gypsum and pellets to form a composite panel;
   drying the composite panel within the dryers to a temperature in excess of approximately 140° F., the drying causing the pellets to dissolve and the residual moisture to be removed from the board, whereby the dissolved pellets provide starch to the gypsum slurry and create voids within the set gypsum.

2. The method as described in claim 1 comprising the further step of combining air and starch to form the starch pellets.

3. A method of producing building board, the method utilizing starch, stucco, and water, the method comprising:
   combining the starch with air to form starch pellets, the pellets being slightly soluble at temperatures below approximately 140° F.;
   mixing the starch pellets with the stucco and the water to form a slurry, with the mixing serving to fully encapsulate the pellets within the slurry;
   dispensing the slurry between opposing sheets to form a composite panel;
   drying the composite panel, the drying causing the pellets to dissolve and the slurry to set, whereby the dissolved pellets provide starch to the slurry and create voids within the set slurry.

4. The method as described in claim 3 wherein the pellet to stucco ratio is between 5/100 to 50/100 by volume.

5. The method as described in claim 3 wherein the pellets are formed via an extrusion or other foaming procedure.

6. The method as described in claim 3 wherein the pellets are hydrophobic at temperatures below approximately 140° F.

7. The method as described in claim 3 wherein the pellets are formed from an ethylated starch.

8. The method as described in claim 3 wherein the starch pellets are formed via a prilling process.

9. A method of producing a gypsum board having opposing sheets and a core with voids, the method comprising:
   providing a volume of gypsum slurry;
   providing an amount of starch;
   mixing the starch with air and water;
   drying the mixture to form a number of dry starch pellets;
   adding the starch pellets to the gypsum slurry;
   mixing the starch pellets with the slurry to fully encapsulate the pellets;
   depositing the starch pellet and slurry mixture between the opposing sheets;
   drying the slurry to dissolve the starch pellets and create the voids within the core, the dissolved starch pellets providing a concentration of starch within the gypsum board.

10. The method as described in claim 9 wherein the voids include a lining and wherein the concentration of the dissolved starch is higher at the void lining than in the core body, whereby the void lining is strengthened and the resulting board is likewise strengthened.

11. The method as described in claim 9 wherein the pellets have an approximate particle size that is greater than 800 microns.

12. The method as described in claim 9 wherein the pellets have an approximate particle size that is less than 400 microns.

13. The method as described in claim 9 wherein the dissolved starch pellets yield a uniform bubble structure within core, thereby strengthening the core.

14. The method as described in claim 9 wherein the pellets and stucco are combined at a ratio of between 5/100 to 50/100 by volume.

15. The method as described in claim 9 including the additional step of forming the pellets via an extrusion process.

16. The method as described in claim 9 wherein the pellets are hydrophobic at temperatures below approximately 140° F.

17. The method as described in claim 9 comprising the further step of forming the pellets from an ethylated starch.

18. The method as described in claim 3 wherein the voids include a lining and wherein the concentration of the dissolved starch is higher at the void lining than in the core body, whereby the void lining is strengthened and the resulting board is likewise strengthened.

* * * * *